(12) United States Patent  
Mori et al.

(10) Patent No.: US 8,469,448 B2
(45) Date of Patent: Jun. 25, 2013

(54) OPERATION MECHANISM OF SIDE SUPPORT APPARATUS AND SIDE SUPPORT APPARATUS USING SAME FOR VEHICULAR SEAT

(75) Inventors: Masatoshi Mori, Anjo (JP); Hideaki Honjo, Chiryu (JP); Tadasuke Higuchi, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 354 days.

(21) Appl. No.: 13/018,730

(22) Filed: Feb. 1, 2011

(65) Prior Publication Data

US 2011/0210590 A1 Sep. 1, 2011

(30) Foreign Application Priority Data

Feb. 26, 2010 (JP) .................................. 2010-041918

(51) Int. Cl.
*B60N 2/64* (2006.01)
(52) U.S. Cl.
USPC ..................................................... 297/284.9
(58) Field of Classification Search
USPC .................. 297/216.1, 216.13, 284.9, 284.11
See application file for complete search history.

(56) References Cited

U.S. PATENT DOCUMENTS

| 5,340,185 | A * | 8/1994 | Vollmer ..................... 297/284.11 |
| 5,857,743 | A * | 1/1999 | Ligon et al. ................. 297/284.9 |
| 7,140,681 | B2 * | 11/2006 | McMillen ................... 297/284.9 |
| 7,425,036 | B2 * | 9/2008 | McMillen ................... 297/284.4 |
| 7,766,425 | B2 * | 8/2010 | Poniatowski ............... 297/284.9 |
| 2005/0046252 | A1 * | 3/2005 | McMillen ................... 297/284.1 |
| 2009/0026821 | A1 * | 1/2009 | Macht et al. ................ 297/284.9 |
| 2009/0051200 | A1 * | 2/2009 | Stoessel et al. ............ 297/284.9 |

FOREIGN PATENT DOCUMENTS

JP 2005-206027 8/2005

* cited by examiner

*Primary Examiner* — Peter Brown
(74) *Attorney, Agent, or Firm* — Oblon, Spivak, McClelland, Maier & Neustadt, L.L.P.

(57) ABSTRACT

An operation mechanism of a side support apparatus adapted to be accommodated in a right and left side support portions provided at a seatback and being movable between a support position and an open position, includes a support structure including a pulley and being movable between the open position and the support position, a first fixing portion including a first guide portion and a second guide portion and fixedly provided at a seatback member, and a drive cable being fixedly attached to the first fixing portion at a first end portion of the drive cable and being engaged with the pulley at an intermediate of the drive cable. The pulley is pushed by a tensile force generated at the drive cable by pulling the drive cable so that the support structure is movable relative to the first fixing portion in a direction toward the support position.

17 Claims, 10 Drawing Sheets

OPERATION MECHANISM OF SIDE SUPPORT APPARATUS AND SIDE SUPPORT APPARATUS USING SAME FOR VEHICULAR SEAT

CROSS REFERENCE TO RELATED APPLICATIONS

This application is based on and claims priority under 35 U.S.C. §119 to Japanese Patent Application 2010-041918, filed on Feb. 26, 2010, the entire content of which is incorporated herein by reference.

TECHNICAL FIELD

This disclosure relates to an operation mechanism of a side support apparatus that is accommodated in a side support portion of a seatback and operated so as to push a side of a seat occupant, and relates to the side support apparatus using same adapted to be mounted on a vehicle using same.

BACKGROUND DISCUSSION

In response to a recent sophistication of vehicles, seats for the vehicles having more additional functions than ever have been developed. One example is the seat for the vehicle having a side support apparatus, where a support member is accommodated inside a side support portion of a seatback. The support member, which is actuated by an electric motor or the like, pushes the sides of an occupant seated on the seat and supports the occupant from both sides. Consequently, the occupant is stably supported in the seat against a lateral load during cornering of the vehicle.

A known side support apparatus of a seat for a vehicle is disclosed in JP2005-206027A as shown in FIG. 11. FIG. 11 shows a cross section of the side support portion provided at a right-hand end portion of the seatback. In FIG. 11, a left-hand direction refers to a front of the seat for the vehicle. A side support portion having the same structure as that shown in FIG. 11 is provided at a left-hand end portion of the seatback, which is not illustrated. A side support apparatus 100 disclosed in JP2005-206027A includes a pair of brackets 103, 103 and a support plate 104 engaging with the pair of brackets 103, 103. The brackets 103, 103 are provided at a front face of a side frame 102 supporting a seatback 101 in a manner that the brackets 103, 103 face each other in a vertical direction of the seat.

Each bracket 103 includes a pair of engaging holes 103a, 103b. An engaging pin 104a provided at a lower portion of the support plate 104 is inserted into the engaging holes 103a, 103a, and an engaging pin 104b provided at an upper portion of the support plate 104 is inserted into the engaging holes 103b, 103b. Consequently, the support plate 104 is movably supported by the brackets 103, 103. An electric motor 106 is connected, via a transmission mechanism 105 including a screw and the like, to the engaging pin 104a that is inserted into one of the engaging holes, 103a, 103b. As the electric motor 106 operates, the engaging pin 104a is pulled approximately in a length direction of the engaging hole 103a (indicated by an arrow B in FIG. 11), and thus the support plate 104 moves along the engaging holes 103a, 103b.

A front face of the support plate 104 is attached to a back face of a side pad 107a that is included in a side support portion 107. Accordingly, when the support plate 104 moves along the engaging holes 103a, 103b, the side pad 107a is pivoted about a point C relative to a top board 108 of the seatback 101 (refer to FIG. 12). A pair of the side pads 107a, 107a, that is, the side pads 107a, 107a provided on the left and right sides of the seatback, is pivoted as described above and supports an upper body of the occupant in the seat from both sides. The point C refers to a front end on a boundary between the side support portion 107 and the top board 108.

In the known side support apparatus 100 shown in FIG. 11, the engaging holes 103a, 103b are formed into arc shapes whose centers correspond to the point C because the side pad 107a is pivoted about the point C. Accordingly, in case a pivot angle of the side pad 107a needs to be increased, the engaging holes 103a, 103 need to be formed into longer arc shapes, which leads to increased size of the side support apparatus 100. Considering that a dimension of the seatback 101 in a width direction is limited, it may be difficult to accommodate the side support apparatus 100 inside the seatback 101 when the pivot angle of the side pad 107a is too large.

Meanwhile, it is considered that the pivot angle of the side pad 107a may be increased without increasing the dimension of the seatback 101 of the side support apparatus 100 in the width direction by providing the engaging hole 103b, which is positioned in a direction of a pivoting movement of the side pad 107a, in a manner that the engaging hole 103b extends in a front-rear direction of the seat (refer to FIG. 13). Consequently, a front end of the support plate 104 relative to the direction of the pivoting movement is pivoted forward, and thus the pivot angle of the side pad 107a is significantly increased. The transmission mechanism 105, and the top board 108 of the seatback 101 are not illustrated in FIG. 13.

On the other hand, an angle formed by a lengthwise direction of the engaging hole 103b, which is positioned in the direction of the pivoting movement of the side pad 107a, and by a direction in which the support plate 104 is pulled by the transmission mechanism 5 (indicated by the arrow B in FIG. 13) is increased. This causes a sliding friction between the engaging hole 103b and the engaging pin 104b, thereby making it difficult to move the support plate 104 along the engaging holes 103a, 103b smoothly. In other words, a driving force for moving the support plate 104 needs to be increased, which may lead to increased sizes of the transmission mechanism 105 and the electric motor 106.

In order to move the support plate 104 along the engaging holes 103a, 103b smoothly, a method is possible where the transmission mechanism 105 is connected to the engaging pin 104b, which is positioned in the direction of the pivoting movement of the side pad 107a, so as to push the engaging pin 104b in the lengthwise direction of the engaging hole 103b (the front-rear direction of the seat for the vehicle). A dimension of the seatback 101 in the front-rear direction is, however, even more limited than that in the width direction. Therefore it is almost impossible to place the transmission mechanism 105 in the seatback 101 in the front-rear direction. A need thus exists for an operating mechanism of a side support apparatus and the side support apparatus using the operation mechanism, the side support apparatus adapted to be mounted on a seat for a vehicle, which is not susceptible to the drawback mentioned above.

SUMMARY

According to an aspect of this disclosure, an operation mechanism of a side support apparatus adapted to be accommodated in each of a right side support portion and a left side support portion both provided at a seatback and being movable between a support position at which sides of a body of a seat occupant is supported and an open position at which the sides of the body of the seat occupant is unsupported, includes a support structure including a pulley which is rotatable and being movable between the open position and the support position. The operation mechanism of the side support apparatus further includes a first fixing portion adapted to be fixedly provided at a seatback member, and including a first guide portion and a second guide portion. The first guide portion is provided at the first fixing portion in an extending manner to restrict a direction of a movement of the support structure. The second guide portion is provided at the first fixing portion in an extending manner in a direction that crosses with an extending direction of the first guide portion and restricts the direction of the movement of the support structure cooperatively with the first guide portion. The operation mechanism of the side support apparatus further includes a drive cable which is fixedly attached to the first fixing portion at a first end portion of the drive cable and is engaged with an outer periphery of the pulley at an intermediate between the first end portion and a second end portion of the drive cable, The pulley is pushed by a tensile force generated at the drive cable by pulling the drive cable at the second end portion so that the pulley is movable in the extending direction of the first guide portion and that the support structure is movable relative to the first fixing portion in a direction toward the support position.

According to another aspect of this disclosure, a side support apparatus adapted to be mounted on a vehicular seat includes an operation mechanism of a side support apparatus adapted to be accommodated in each of a right side support portion and a left side support portion both provided at a seatback and being movable between a support position at which sides of a body of a seat occupant is supported and an open position at which the sides of the body of the seat occupant is unsupported, includes a support structure including a pulley which is rotatable and being movable between the open position and the support position. The operation mechanism of the side support apparatus further includes a first fixing portion adapted to be fixedly provided at a seatback member, and including a first guide portion and a second guide portion. The first guide portion is provided at the first fixing portion in an extending manner to restrict a direction of a movement of the support structure. The second guide portion is provided at the first fixing portion in an extending manner in a direction that crosses with an extending direction of the first guide portion and restricts the direction of the movement of the support structure cooperatively with the first guide portion. The operation mechanism of the side support apparatus further includes a drive cable which is fixedly attached to the first fixing portion at a first end portion of the drive cable and is engaged with an outer periphery of the pulley at an intermediate between the first end portion and a second end portion of the drive cable. The pulley is pushed by a tensile force generated at the drive cable by pulling the drive cable at the second end portion so that the pulley is movable in the extending direction of the first guide portion and that the support structure is movable relative to the first fixing portion in a direction toward the support position. The side support apparatus adapted to be mounted on the vehicular seat also includes a cable drive device including an electric motor which rotates for pulling the drive cable at the second end portion thereof when electricity is supplied, a pinion gear connected to an output shaft of the electric motor, a helical gear engaging with the pinion gear and being unmovable in a direction of a rotation axis thereof, and a screw member being movable in a direction of a rotation axis thereof and unrotatable. An outer periphery of the screw member engages with an inner periphery of the helical gear and an end portion of the screw member is connected to the drive cable. The screw member is moved in the direction of the rotation axis thereof via the pinion gear and the helical gear by means of driving the electric motor to rotate so that the drive cable is pulled,

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
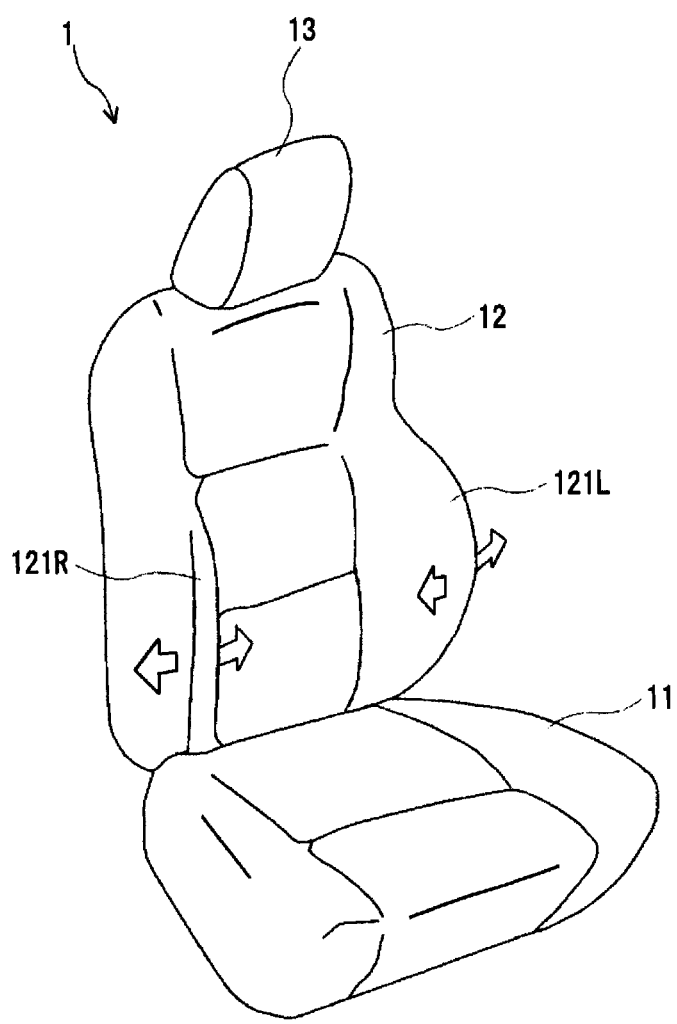
FIG. 1 is a perspective view of a seat for a vehicle, in which a side support apparatus according to a first embodiment of this disclosure is accommodated.

A first embodiment of this disclosure will be explained with reference to illustrations of drawings as follows, In the description of this disclosure, a front direction relative to an occupant seated on a seat 1 for a vehicle (hereinafter referred to as the seat 1) refers to a front direction of the seat 1, a right-hand direction relative the occupant refers to a right-hand direction of the seat 1, a left-hand direction relative to the occupant refers to a left-hand direction of the seat 1. As used herein, the terms "a front-rear direction", "a vertical direction" and "a lateral direction", and derivatives thereof refer to the directions relative to the seat 1. In this disclosure, one end portion of an operation cable 47 (including an inner cable 471 and an outer cable 472), that is, one end portion which is positioned closer to paddle mechanisms 4R, 4L (a paddle mechanism 4R and a paddle mechanism 4L), is referred to as a first end portion, and the other end portion of the operation cable 47, that is, the end portion which is closer to an electric motor 51 is referred to as a second end portion.

As shown in FIG. 1, the seat 1 is provided with a seat cushion 11 on which the occupant is seated, and a seatback 12 which is mounted on a rear end portion of the seat cushion 11 so as to be pivotable in the front-rear direction and which the occupant leans on. The seat 1 is also provided with a headrest 13 mounted on an upper end of the seatback 12 for supporting the head of the occupant.

A right side support portion 121R is provided at a right end portion of the seatback 12 so as to protrude in the front direction for supporting the upper body of the occupant seated on the seat cushion 11 from the right-hand direction. A left side support portion 121L is provided at a left end portion of the seatback 12 so as to protrude in the front direction for supporting the upper body of the occupant seated on the seat cushion 11 from the left-hand direction. The right side support portion 121R and the left side support portion 121L will be hereinafter collectively referred to as side support portions 121R, 121L.

The right paddle mechanism 4R of the side support apparatus 3 is accommodated in the right side support portion 121R, and the left paddle mechanism 4L of the side support apparatus 3 is accommodated in the left side support portion 121L. The side support apparatus 3 will be explained later on in this specification. The side support portions 121R, 121L are actuated to push or press sides of the body, for example, the upper body, of the occupant when the right paddle mechanism 4R and the left paddle mechanism 4L operate. The right paddle mechanism 4R and the left paddle mechanism 4L will be hereinafter collectively referred to as the paddle mechanisms 4R, 4L (the paddle mechanisms 4R, 4L serve as an operating mechanism of the side support apparatus 3).

Figure 2:
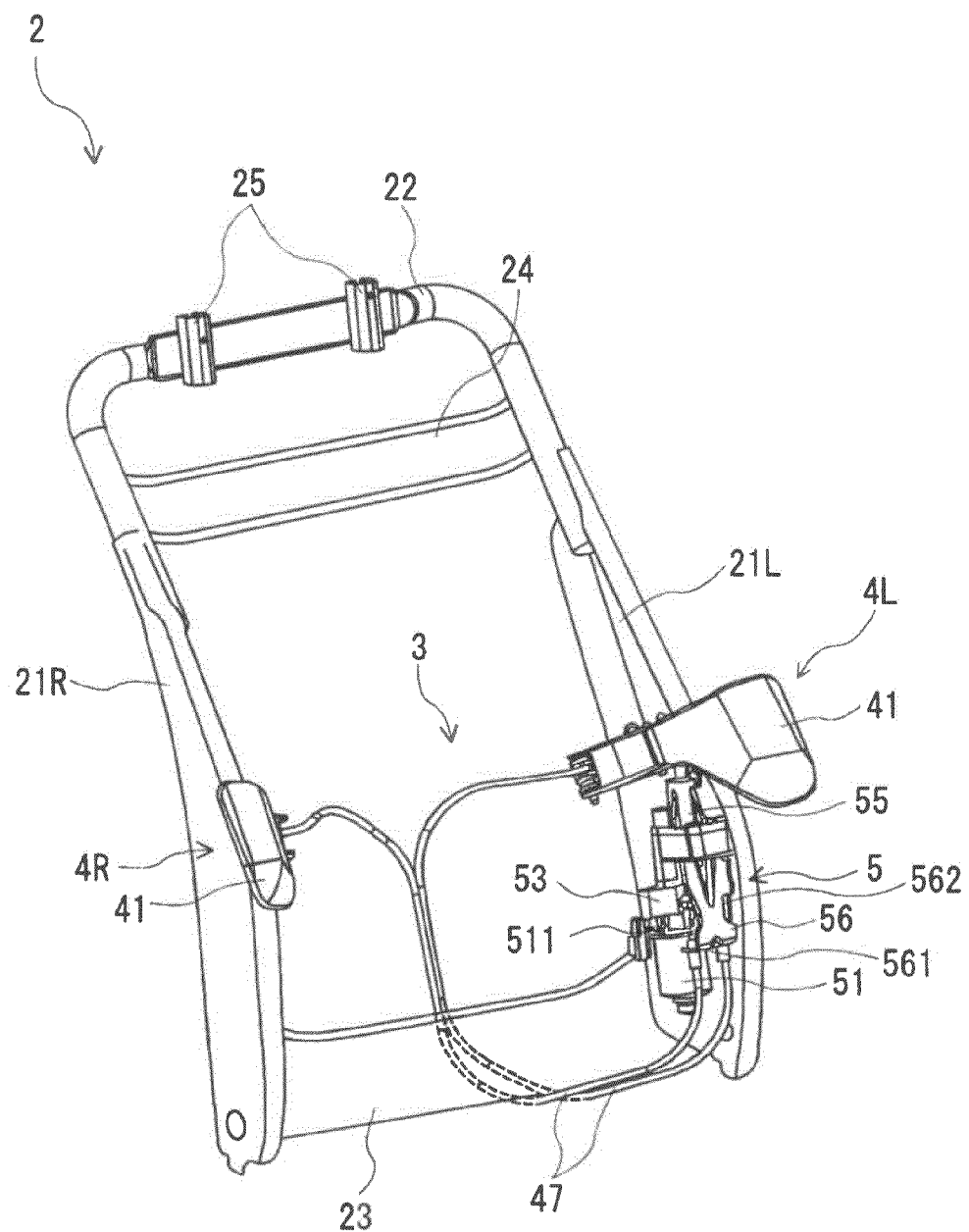
FIG. 2 is a perspective view of a seatback frame on which the side support apparatus according to the first embodiment of this disclosure is adapted to be mounted.

As shown in FIG. 2, a seatback frame 2 is accommodated in the seatback 12. The seatback frame 2 includes at a right end thereof a right side frame 21R arranged so as to extend in the vertical direction, and includes at a left end thereof a left side frame 21L arranged so as to extend in the vertical direction of the seat 1 (the right side frame 21R and the left side frame 21L serve as seatback members. The seatback frame 2 also includes at an upper end thereof an upper cross member 22 connecting the right side frame 21R with the left side frame 21L, and includes at a lower end thereof a lower cross member 23 connecting the right side frame 21R with the left side frame 21L.

A reinforcement member 24 is provided below the upper cross member 22 and connects the right side frame 21R with the left side frame 21L. Support rods protruding from a bottom surface of the headrest 13 are inserted into a pair of headrest attachment portions 25, 25 provided at the upper cross member. The seatback frame 2 having the above-described structure is accommodated in the seatback 12 so as to support the seatback 12 from inside the seatback 12. As shown in FIG. 2, a cable actuator 5 and the left paddle mechanism 4L both of which constitute the side support apparatus 3 are mounted on the left side frame 21L. The right paddle mechanism 4R of the side support apparatus 3 is mounted on the right side frame 21R.

Figure 3:
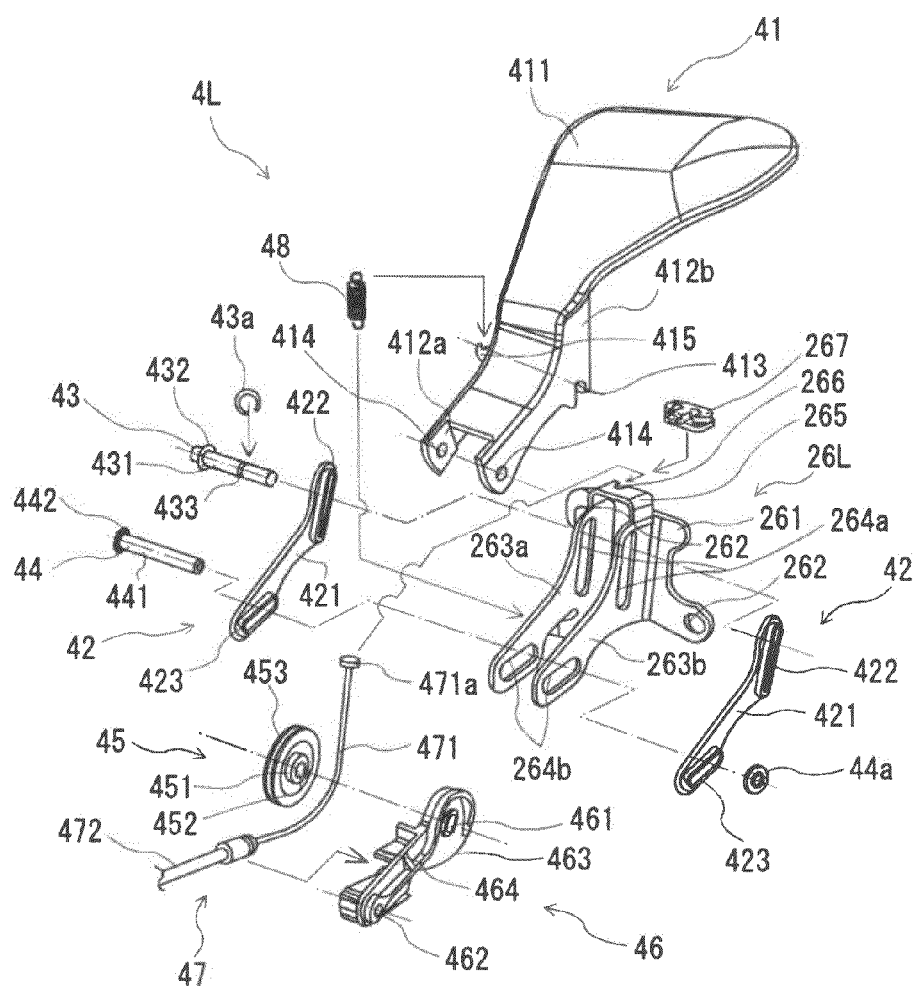
FIG. 3 is an exploded perspective view of a left paddle mechanism and a left mount bracket according to the first embodiment of this disclosure.
Figure 4:
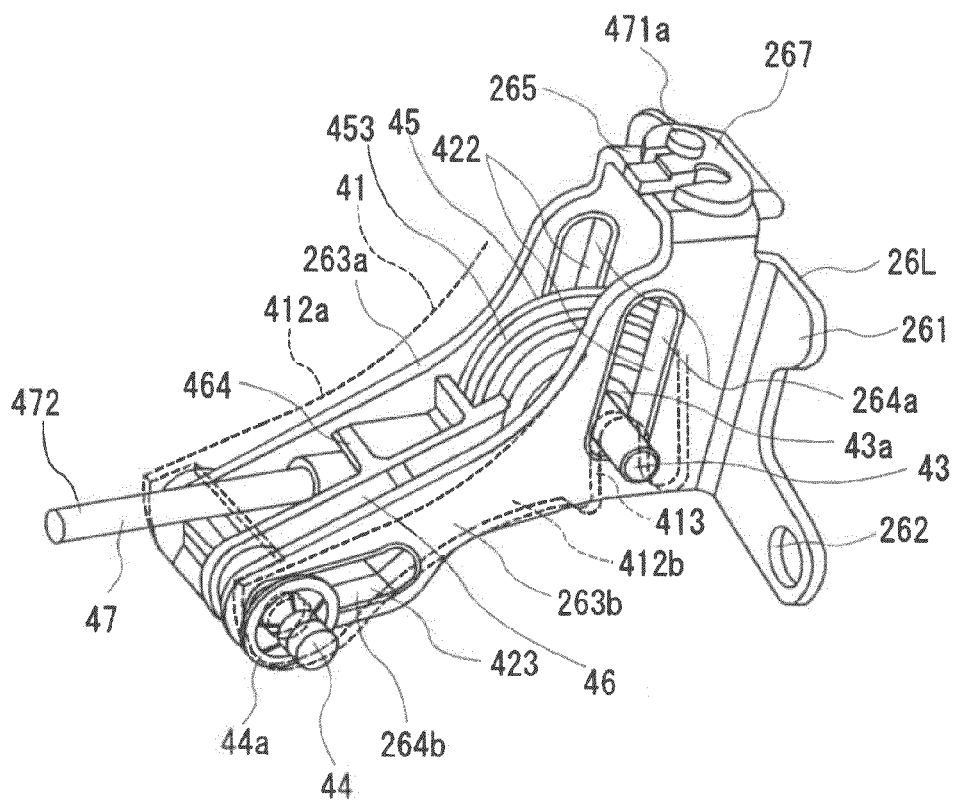
FIG. 4 is a perspective outline view of the left paddle mechanism mounted on the left mount bracket.

In FIG. 4, the broken lines show a portion of a paddle body 41, to which a primary pin 43 and a secondary pin 44 are attached. The left paddle mechanism 4L and a left mount bracket 26L will be explained with reference to FIGS. 3 and 4 as follows. Structures of the right paddle mechanism 4R and a right mount bracket are identical to those of the left paddle mechanism 4L and the left mount bracket 26L except that they are left-right symmetrical, and thus the explanations of the structures of the right paddle mechanism 4R and the right mount bracket will be omitted.

The left mount bracket 26L (the left mount bracket 26L and the right mount bracket 26R serve as first fixing portion) is made by press-molding a steel plate and is provided with a flat portion 261 which is fixedly attached to the left side frame 21L. Plural attachment holes 262, which are through holes, are formed on the flat portion 261 and attachment bolts are inserted into the attachment holes 262.

A pair of guide face portions 263a, 263b is formed on the flat portion 261 so as to have an identical shape and to extend parallelly to each other, allowing a predetermined distance therebetween. A first guide hole 264a and a second guide hole 264b, both of which are through holes, are formed on each of the guide face portion 263a and the guide face portion 263b. The first guide hole 264a and the second guide hole 264b are formed in an extending manner so as to restrict a direction of a movement of the paddle body 41. The first guide holes 264a, 264a (the first guide hole 264a serves as a first guide portion) are formed at an identical position of the guide face portions 263a, 263b, and are formed into an identical long-hole shape. The first guide holes 264a, 264a are formed to extend in a vertical direction of FIG. 3, that is, in a substantially front-rear direction of the seat 1.

Figure 5:
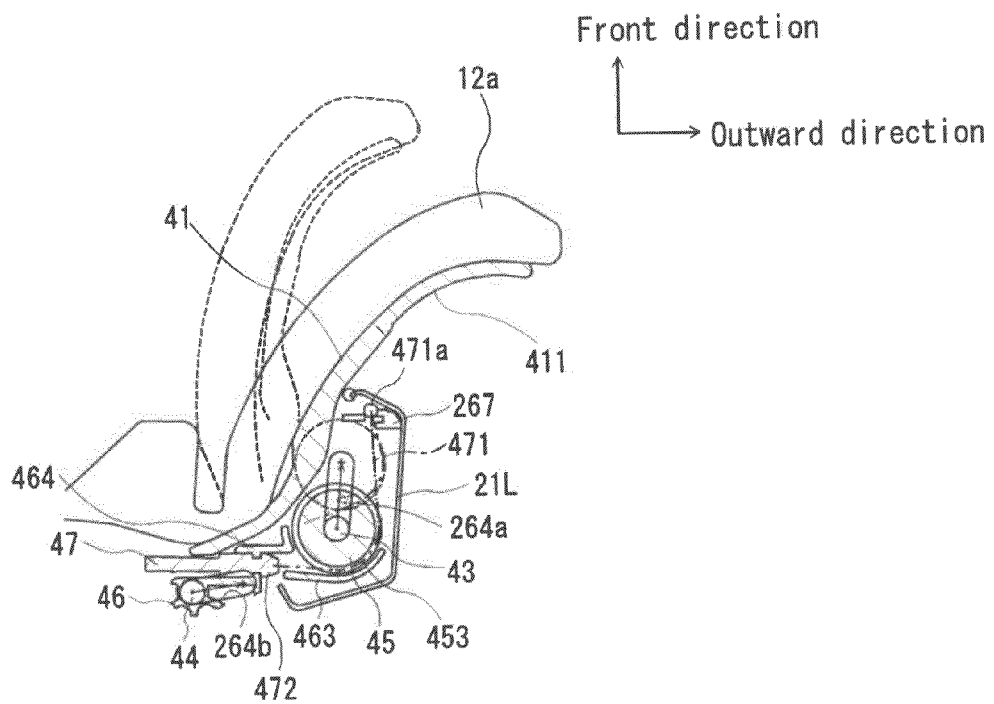
FIG. 5 is a schematic view for explaining a movement of the paddle mechanism.

The second guide holes 264b, 264b (the second guide hole 264b serves as a second guide portion) are formed at an identical position of the guide face portions 263a, 263b, and are formed into an identical long-hole shape. As shown in FIG. 5, the second guide holes 264b, 264b are formed so as to extend in a width direction of the seat 1, and outward portions of the second guide holes 264b, 264b relative to the width direction of the seat 1 are slightly angled upward when viewed in FIG. 5. Accordingly, the second guide holes 264b, 264b extend in a direction that crosses with a direction in which the first guide holes 264a, 264a extend. The first guide holes 264a, 264a and the second guide holes 264b, 264b will be hereinafter collectively referred to as the guide holes 264a, 264b.

A bridge portion 265 having a rectangular shape is provided at an upper end portion (when viewed in FIG. 3) of the left mount bracket 26L so as to connect the guide face portions 263a and the 263b with each other. A notch 266 is provided at an end portion of the bridge portion 265, on the same side as the flat portion 261, so as to receive the first end portion of the inner cable 471. At a lower end portion (when viewed in FIG. 3) of the guide face portion 263a of the left mount bracket 26L, a hook for supporting a lower end portion of a return spring 48 is provided.

The left paddle mechanism 4L includes a pair of guide plates 42, 42 one of which is attached to the guide face portion 263a and the other one of which is attached to the guide face portion 263b. Each guide plate 42 is a one-piece plate made from a material having a low friction coefficient, such as polyamide resin, but not limited to this. The guide plate 42 includes a flat plate portion 421, and a pair of guide flanges 422, 423 each protruding from the flat plate portion 421 in the lateral direction. The guide flanges 422, 423 are formed into loops so as to mate with the first guide hole 264a and the second guide hole 264b respectively. Radially inside portions of the guide flanges 422, 423 are formed to be through holes.

The guide flanges 422, 423 are inserted into the first and second guide holes 264a, 264b until the flat plate portions 421, 421 come in contact with the corresponding first and second guide holes 264a, 264b. When the guide plates 42, 42 are attached to the left mount bracket 26L, the guide flanges 422, 423 cover inner surfaces of the first guide hole 264a and the second guide hole 264b respectively.

The primary pin 43 (serving as a first pin member) is inserted into the first guide holes 264a, 264a of the guide face portions 263a, 263b so as to be slidable in the first guide holes 264a, 264a. The primary pin 43 includes a shaft portion 431 formed into a cylindrical shape, and a flange portion 432 provided at one end portion of the primary pin 43 for restricting the primary pin 43 from coming off in an axial direction of the primary pin 43. A clip groove 433 is formed on the shaft portion 431 in a circumferential direction thereof for engaging with a C-shaped clip 43a. An outer diameter of the shaft portion 431 is set to be slightly smaller than widths of the through holes defined by the guide flanges 422, 422 of the guide plates 42, 42 so that the primary pin 43 slides in the first guide holes 264a, 264a in a lengthwise direction thereof smoothly, that is, no rattling is caused between the primary pin 43 and the first guide holes 264a, 264a.

The secondary pin 44 (serving as a second pin member) is inserted into the second guide holes 264b, 264b of the guide face portions 263a, 263b so as to be slidable in the second guide holes 264b, 264b. The secondary pin 44 includes a shaft portion 441 formed into a cylindrical shape, and a flange portion 442 provided at one end portion of the secondary pin 44 for retaining the secondary pin 44 in the second guide holes 264b, 264b. An outer diameter of the secondary pin 44 is set to be slightly smaller than widths of the through holes defined by the guide flanges 423, 423 of the guide plates 42, 42 so that the secondary pin 44 slides in the second guide holes 264b, 264b in a lengthwise direction thereof smoothly, that is, no rattling is caused between the secondary pin 44 and the second guide holes 264b, 264b. A friction resistance of the primary pin 43 and the secondary pin 44, against the first guide holes 264a, 264a and the second guide holes 264b, 264b respectively, is reduced by allowing the primary pin 43 and the secondary pin 44 to slide relative to the guide plates 42, 42. And thus, the primary pin 43 and the secondary pin 44 slide smoothly inside the first guide holes 264a, 264a and the second guide holes 264b, 264b respectively.

A pulley 45 is a one-piece disc made from a synthetic resin material and an outer periphery of the pulley 45 has a true circularity. A boss portion 451 is formed in a protruding manner on one side of the pulley 45, in the center of the disc shape. A pin insert hole 452, which is a through hole for receiving the primary pin 43, is formed in a center portion of the boss portion 451. The pulley 45 is supported so as to be rotatable about the primary pin 43. An inner diameter of the pin insert hole 452 is set to be slightly larger than the outer diameter of the shaft portion 431 of the primary pin 43 so that the pulley 45 rotates relative to the primary pin 43 smoothly, that is, no rattling is caused between the pulley 45 and the primary pin 43. A cable slit 453 is formed on the outer periphery of the pulley 45. The cable slit 453 is a single slit on which the inner cable 471 is wound.

A moving member 46 is made from a synthetic resin material and is formed into one-piece. A lateral thickness of the moving member 46 is set to be equal to a distance between the guide face portions 263a and 263b so that the moving member 46 is disposed between the guide face portions 263a and the 263b without allowing rattling among the guide face portion 263a, the moving member 46 and the guide face portion 263b. The moving member 46 serves as a supporting body. The moving member 46, together with the paddle body 41, serves also as a moving body.

The moving member 46 is formed so as to have a length extending between the first guide holes 264a, 264a and the second guide holes 264b, 264b. A boss portion insert hole 461, into which the boss portion 451 of the pulley 45 is inserted, is provided at one end portion of the moving member 46 relative to a lengthwise direction thereof. An inner diameter of the boss portion insert hole 461 is set to be slightly larger than an outer diameter of the boss portion 451 so that the pulley 45 rotates relative to the moving member 46 smoothly, that is, no rattling is caused between the pulley 45 and the moving member 46. Accordingly, the pulley 45 is supported so as to be rotatable relative to the primary pin 43 and to the moving member 46.

The other end portion of the moving member 46 relative to the lengthwise direction thereof is provided with a positioning hole 462 into which the secondary pin 44 is inserted. An inner diameter of the positioning hole 462 is set to be slightly larger than the outer diameter of the shaft portion 441 of the secondary pin 44 so that the moving member 46 rotates relative to the secondary pin 44 smoothly, that is, no rattling is caused between the moving member 46 and the secondary pin 44. As shown in FIGS. 3 and 5, a cable guide 463 is provided at the lower end portion (when viewed in FIG. 3) of the moving member 46. The inner cable 471 wound on the outer periphery of the pulley 45 is guided from a radially outward direction of the pulley 45 by the cable guide 463 that is formed into an arc shape so as to cover the outer periphery of the pulley 45. As shown in FIGS. 4 and 5, the moving member 46 is formed with a cable retainer 464 that engages with and holds the first end portion of the outer cable 472.

The operation cable 47 includes the inner cable 471, and the outer cable 472 that covers the inner cable 471 so that the inner cable 471 is slidable (movable) relative to the outer cable 472. An outer end portion 471a having an enlarged diameter is provided at one end portion (the first end portion) of the inner cable 471 (serving as a drive cable).

The paddle body 41 (serving as a support body) is made from a synthetic resin material and is formed into one-piece. The paddle body 41 includes a paddle portion 411 and a pair of attachment faces 412a, 412b. The paddle portion is formed into a fin-shape so as to push the side of the body of the occupant seated on the seat 1. The attachment faces 412a, 412b are formed so as to protrude parallelly to each other from the paddle portion 411. The paddle body 41 is provided in such a manner that the attachment faces 412a, 412b sandwich the guide face portions 263a, 263b of the left mount bracket 26L. Accordingly, a distance between the attachment faces 412a and 412b is set to be slightly larger than a distance between the guide face portions 263a and 263b. An engagement groove 413 (serving as a notch) and a retention hole 414 are provided on each of the attachment faces 412a, 412b. In FIG. 3, the engagement groove 413 provided on one of the pair of attachment faces 412a, 412b is shown. The primary pin 43 engages with and disengages from the engagement grooves 413, 413. The secondary pin 44 is pivotably supported in the retention hole 414. A hook 415, on which an upper end portion of the return spring 48 is hooked, is provided on one of the pair of the attachment faces 412a, 412b.

As shown in FIG. 5, the paddle body 41 is provided inside the left side support portion 121L of the seatback 12, and a cushion member 12a made of a urethane resin or other material is attached to a forward surface of the paddle body 41. The paddle body 41, the primary pin 43, the secondary pin 44, the pulley 45 and the moving member 46 collectively serve as a support structure.

Next, an overall structure of the left paddle mechanism 4L will be described. The guide plates 42, 42 are preliminary attached to the first guide holes 264a, 264b respectively. The secondary pin 43 is inserted into the first guide hole 264a, which is formed on the left mount bracket 26L provided at a front end portion of the left side frame 21L, from a direction of the guide face portion 263a. More specifically, the primary pin 43 is inserted into the holes or the notch in the following order: the attachment face 412a (the notch 413), the first guide hole 264a of the guide face portion 263a, the pin insert hole 452 of the pulley 45 integrated with the moving member 46, the first guide hole 264a of the guide face portion 263b, and the attachment face 412b (the notch 413) of the paddle body 41. Thus, the pulley 45 and the moving member 46 are retained between the guide face portions 263a and 263b. The C-shaped clip 43a is mounted on the clip groove 433 formed on the primary pin 43 protruding from the moving member 46, that is, the C-shaped clip 43a is positioned between the moving member 46 and the guide face portion 263b. Consequently, the pulley 45 and the moving member 46, which are disposed between the guide face portions 263a and 263b, have no rattling.

Meanwhile, the secondary pin 44 is inserted into the second guide hole 264b, which is formed on the left mount bracket 26L, from the direction of the guide face portion 263a. More specifically, the secondary pin 44 is inserted into the holes or the notch in the following order: the attachment face 412a (the retention hole 414) of the paddle body 41, the second guide hole 264b of the guide face portion 263a, the positioning hole 462 of the moving member 46, the second guide hole 264b of the guide face portion 263b and the attachment face 412b of the paddle body 41 (the retention hole 414). Thus, the end portion of the moving member 46 is retained between the guide face portions 263a and 263b. On the other end portion of the secondary pin 44, that is, the end portion protruding from the attachment face 412b, a push nut 44a is mounted for restricting the secondary pin 44 from coming off in an axial direction of the secondary pin 44.

Consequently, the paddle body 41, the primary pin 43, the secondary pin 44, the pulley 45 and the moving member 46 become integral with one another. The primary pin 43 and the secondary pin 44 are movable between an open position and a support position of the paddle body 41 while being restricted by the first guide holes 264a, 264a and the second guide holes 264b, 264b respectively. In this state, the return spring 48 is tensioned and provided between the hook 415 of the paddle body 41 and the left mount bracket 26L.

An intermediate between the first end portion and the second end portion of the inner cable 471 is engaged with the cable slit 453 of the pulley 45 that is integrated with the moving member 46. The first end portion of the inner cable 471 is inserted in the notch 266 so that the outer end portion 471a protrudes above the bridge portion 265 of the left mount bracket 26L. After that, a fixing clip 267 is mounted on the bridge portion 265. Consequently, the first end portion of the inner cable 471 is securely fixed to the left mount bracket 26L.

As described above, the first end portion of the outer cable 472 is attached to the moving member 46 in a manner that a direction of the outer cable 472 relative to the cable retainer 464 is not changed. Thus, the first end portion of the outer cable 472 is integrally attached to the moving member 46 so as to be longitudinally movable together with the moving member 46. The second end portion of the outer cable 472 will be discussed in a description of the cable actuator 5.

On the paddle body 41, the engagement grooves 413, 413 are formed so as to engage with and disengage from the primary pin 43, and the retention hole 414 is formed so as to pivotably support the secondary pin 44. Thus, when an airbag provided behind the paddle portion 411 of the paddle body 41 is inflated, the primary pin 43 disengages from the paddle body 41 and then the paddle body 41 pivots about the secondary pin 44 in a forward direction of the seat 1, Next, an operation of the left paddle mechanism 4L will be described with the reference mainly to FIGS. 5 and 6. A main section illustrated in FIG. 5 is schematically enlarged in FIG. 6. The orientations of the parts and components shown in FIG. 6 correspond to those in FIG. 5. In FIG. 5 where the seatback 12 stands up to allow the occupant to be seated on the seat 1, an upper direction refers to a substantially front direction of the seat 1, and a right-hand direction refers to an outward direction (a left-hand direction) of the seat 1.

When the cable actuator 5 is inactive and thus is not pulling the operation cable 47, the paddle body 41 is retained in the open position by means of an elastic force of the spring 48 provided between the paddle body 41 and the left mount bracket 26L, and by means of a restoring force of the seatback 12, that is, the paddle body 41 is positioned rearward relative to the support position so as not to restrict the upper body of the occupant (refer to the outline drawn in the full lines in FIG. 5). At this time, the primary pin 43, the secondary pin 44, the pulley 45 and the moving member 46, which are movable together with the paddle body 41, are positioned as illustrated in the full lines in FIG. 5.

When the cable actuator 5 is activated and thus pulling the second end portion of the inner cable 471, whose first end portion is securely fixed to the left mount bracket 26L, in the left-hand direction in FIG. 5, a tensile force is generated at the inner cable 471. The tensile force pushes the pulley 45 in the extending direction (the lengthwise direction) of the first guide hole 264a, that is, in a direction in which the first guide hole 264a extends. When the tensile force exceeds the elastic force of the return spring 48 and the restoring force of the seatback 12, the primary pin 43, the pulley 45 and the moving member 46 moving member with one another in an upward direction as shown in FIG. 5 while being restricted by the first guide holes 264a, 264a.

Meanwhile, as the moving member 46 moves, the secondary pin 44 moves in a diagonally right direction in FIG. 5 while being restricted by the second guide holes 264b, 264b. Consequently, the pulley 45, the moving member 46 and the paddle body 41 move with one another, while relative positions thereof are maintained by the first guide holes 264a, 264a and the second guide holes 264b, 264b. As a result, the pulley 45, the moving member 46 and the paddle body 41 come to reach the support position where the paddle 41 supports the occupant via the cushion member 12a (refer to the outline drawn in the dash line). When the paddle body 41 moves, the first end portion of the outer cable 472 attached to the moving member 46 moves together with the paddle body 41.

To return the paddle body 41 to the support position, the cable actuator 5 is operated in the reverse direction to the above-described direction, and the second end portion of the inner cable 471, which was pulled in the left-hand direction in FIG. 5, is pulled back. Accordingly, the tensile force generated at the inner cable 471 is reduced, and thus the paddle body 41, the pulley 45, the moving member 46 the first end portion of the outer cable 472 are returned to the open position by means of the elastic force of the spring 48 and the restoring force of the seatback 12.

Figure 6:
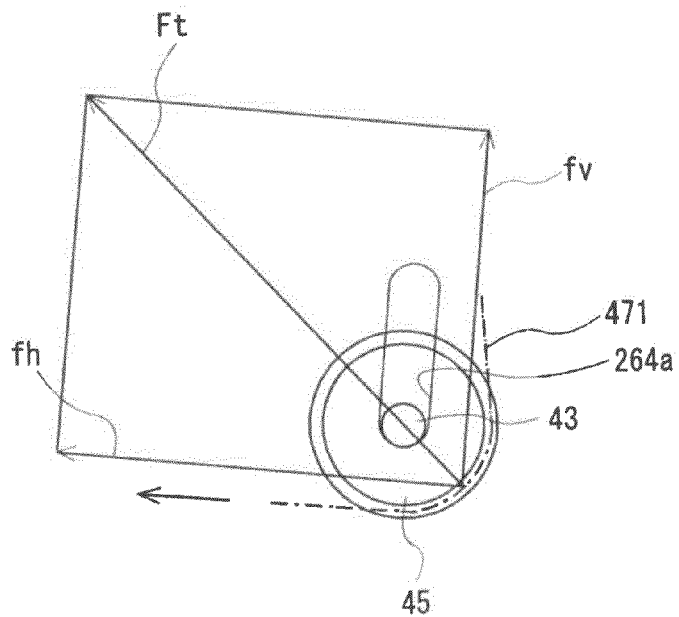
FIG. 6 is a schematic view for explaining a load working on a pulley according to the first embodiment of this disclosure.

When the inner cable 471 is pulled in the left-hand direction in FIG. 5 by the actuator 5, the tensile force generated at the inner cable 471 causes an urging force to work on the pulley 45 as indicated by an arrow Ft in FIG. 6. At this time, a component of a weight vector contributing for moving the paddle body 41 together with the pulley 45 refers to a force N that works in a parallel direction to the length direction of the first guide holes 264a, 264a. Meanwhile, a load fh, which is perpendicular to the lengthwise direction of the first guide holes 264a, 264a, works on inner walls of the first guide holes 264a, 264a but does not contribute for moving the paddle body 41. As is clear from FIG. 6, by using the pulley 45 on which the inner cable 471 is wound, the load fv, which is capable of moving the paddle body 41, is not significantly decreased relative to the load Ft by which the pulley 45 is pushed.

Next, the cable actuator 5 (serving as a cable drive unit) will be described in details with the reference mainly to FIGS. 7 to 10. In FIG. 8 where the seatback 12 stands up to allow the occupant to be seated on the seat 1, a right direction refers to the substantially front direction of the seat 1, and an upper direction refers to a substantially upper direction of the seat 1. The electric motor 51 included. in the cable actuator 5 may be an ordinary electric motor. A battery and an operation switch of the vehicle are electrically connected to the electric motor 51. When electricity is supplied from the battery to the electric motor 51 in response to an actuation of the operation switch by the occupant, the electric motor 51 is rotated. Alternatively, the cable actuator 5 may be structured so that the electric motor 51 is driven by a controller connected thereto when acceleration in the lateral direction of the vehicle is detected.

Figure 7:
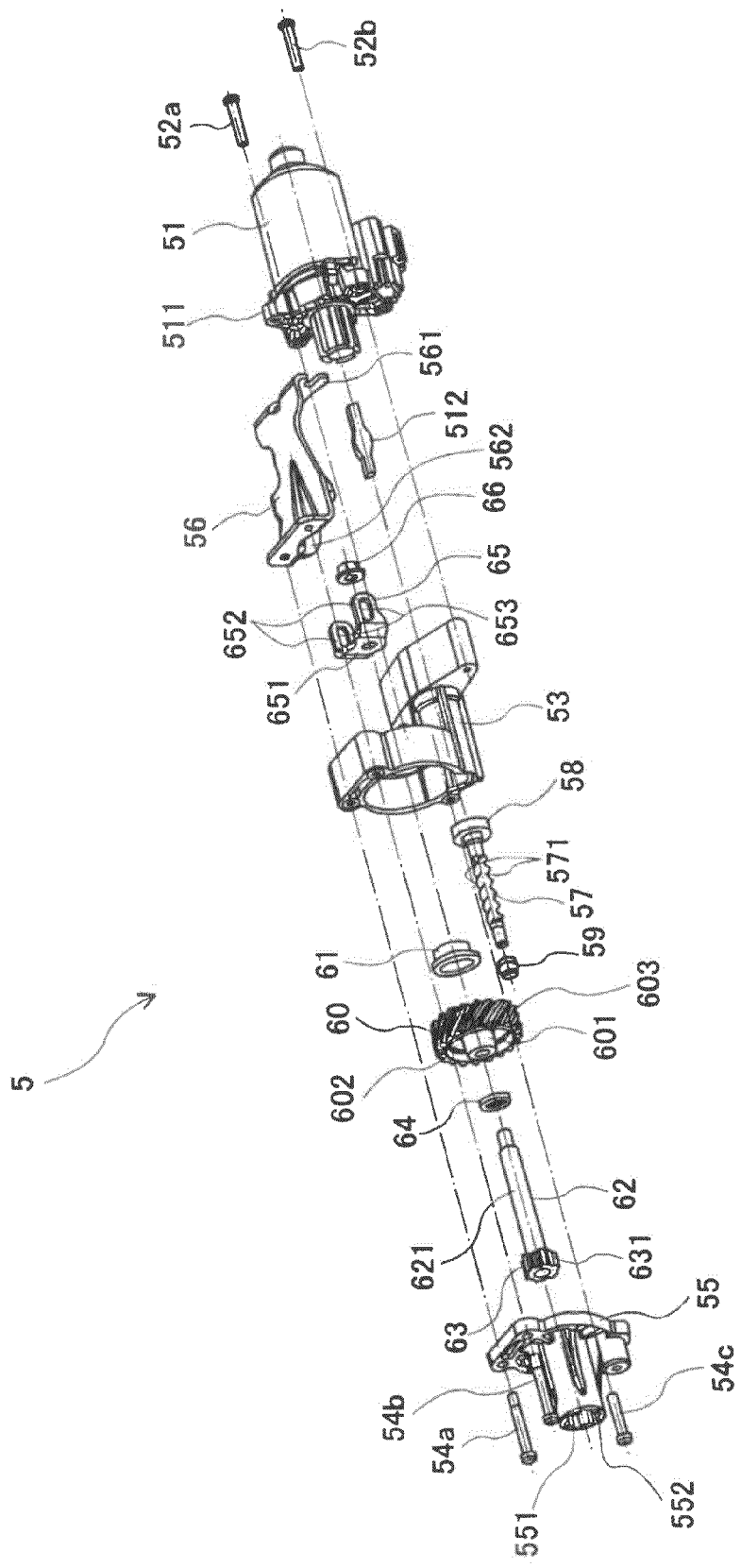
FIG. 7 is an exploded perspective view of a cable actuator of the side support apparatus.
Figure 8:
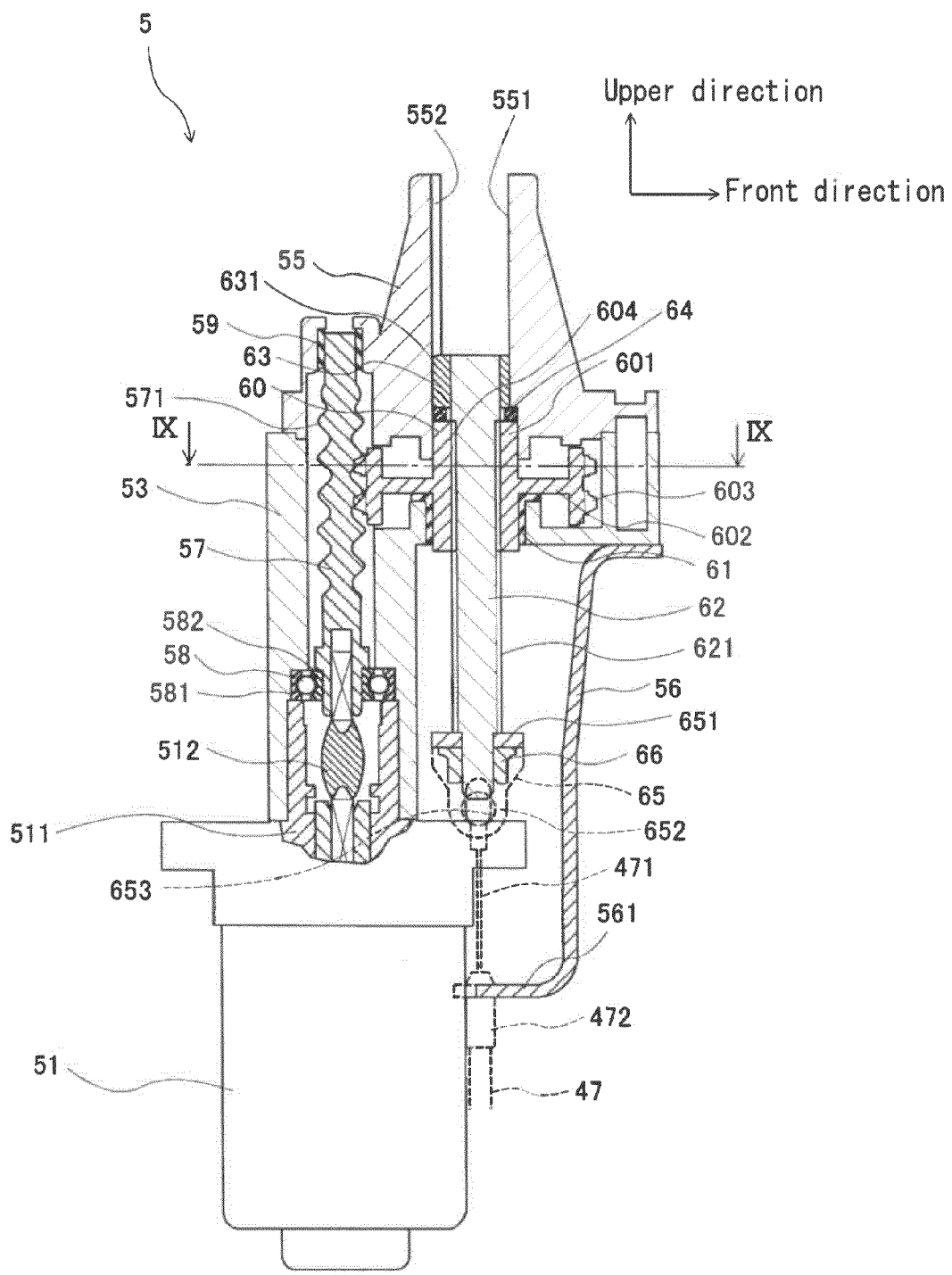
FIG. 8 is a section view of the cable actuator, which is cut in a direction of a rotation axis of an electric motor.

As shown in FIG. 7, a motor housing 511 of the electric motor 51 is coupled to an actuator housing 53 by means of a pair of bolts 52a, 52b. A housing cover 55 is fixedly mounted on the actuator housing 53 by means of three mounting bolts 54a, 54b, 54c. The mounting bolts 54a, 54b are used also to fix an attachment bracket 56 to the actuator housing 53. A lower end portion of the attachment bracket 56 in FIG. 8 (serving as a fixing portion) is bent so as to form a cable retainer 561. As shown in FIG. 8, the second end portion of each outer cable 472 of the paddle mechanisms 4R and 4L is fixed to the cable retainer 561. As shown in FIG. 7, an attachment face 562 is provided at an end portion opposite to the end portion at which the cable retainer 561 is formed, that is, an upper end portion of the attachment bracket 56 in FIG. 8. As shown in FIG. 2, the cable actuator 5 is attached to the left side frame 21L via the attachment face 562 so as to be positioned below the paddle mechanism 4L.

Figure 9:
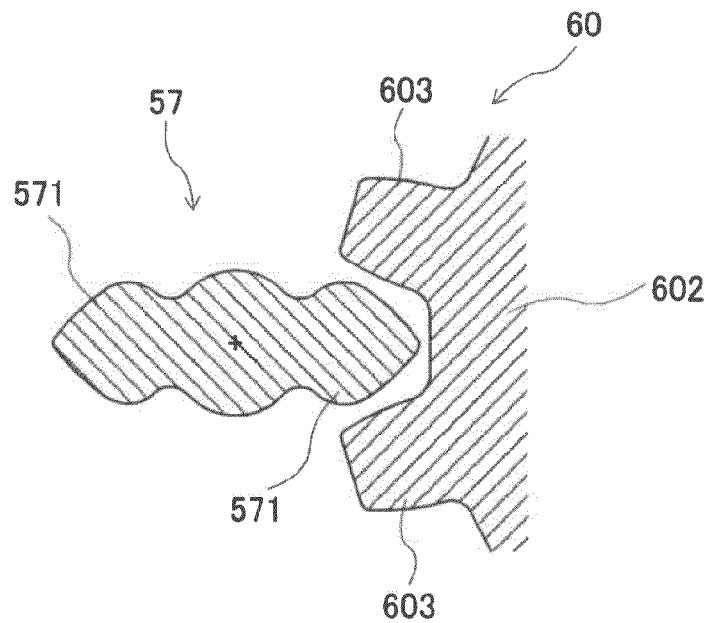
FIG. 9 is a section view taken on line IX-IX illustrated in FIG. 8.

A motor cable 512 connected to an output shaft of the electric motor 51 is housed in the motor housing 511 in a rotatable manner. A bearing 58 is provided inside the actuator housing 53. An outer race 581 of the bearing 58 is sandwiched and supported by a step portion of the actuator housing 53 and by an upper end portion of the motor housing 511 so that a position of the bearing 58 is vertically defined. A lower end portion of a pinion gear 57 (a Logix gear, that is, a line contact gear having circular-arc teeth) that is formed into a long shape is press-fitted in an inner race 582 of the bearing 58. An upper end portion of the pinion gear 57 is supported by the housing cover 55 via a bush 59 made from a synthetic resin material. The pinion gear 57 is connected to the motor cable 512 so as to rotate in the actuator housing 53 together with the motor cable 512. As shown in FIG. 9, the pinion gear 57 refers to a helical gear which is provided with two helical teeth 571 formed on an outer periphery of the pinion gear 57 and having a helix angle of 45 degrees, A helical gear 60 is positioned between the actuator housing 53 and the housing cover 55, and engages with the pinion gear 57. The helical gear 60 includes a shaft portion 601 having a cylindrical shape and provided in the center portion of the helical gear 60 so as to extend in the vertical direction. The helical gear 60 also includes a disc portion 602 that extends from the shaft portion 601 in a radially outward direction. An outer periphery of the disc portion 602 is provided with, for example, sixteen helical teeth 603. The number of the helical teeth, however, is not limited to sixteen.

As shown in FIG. 9, the helical teeth 603 formed on the outer periphery of the helical gear 60 engage with the helical teeth 571 of the pinion gear 57. Due to a difference in the number of teeth between the helical teeth 571 of the pinion gear 57 and the helical teeth 603 of the helical gear 60, the helical gear 60 is rotated at a reduced speed in response to the pinion gear 57. As shown in FIG. 8, a rotation axis of the helical gear 60 and a rotation axis of the pinion gear 57 are parallel to each other.

A bush 61 is disposed between a bottom face of the helical gear 60 and the actuator housing 53 so as to cover an outer periphery of the shaft portion 601 that faces the actuator housing 53 and to cover a bottom face of the disc portion 602. The bush 61 made from a synthetic resin material having a low friction coefficient and is formed into an inverted-hat shape. Accordingly, a position of the helical gear 60 relative to the actuator housing 53 is axially and radially defined. In a state where the disc portion 602 is attached to the actuator housing 53, a top face of the disc portion 602 faces a bottom face of the housing cover 55 leaving a slight gap therebetween.

Figure 10:
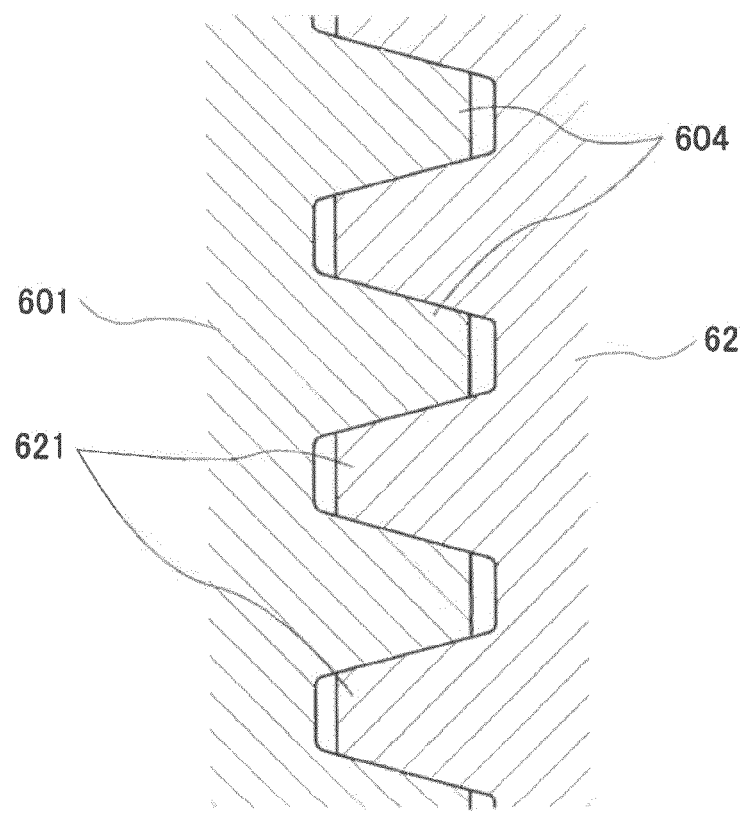
FIG. 10 is an enlarged view of an engagement portion of a pinion gear and a helical gear according to the first embodiment of this disclosure, which are shown in FIG. 8.
Figure 11:
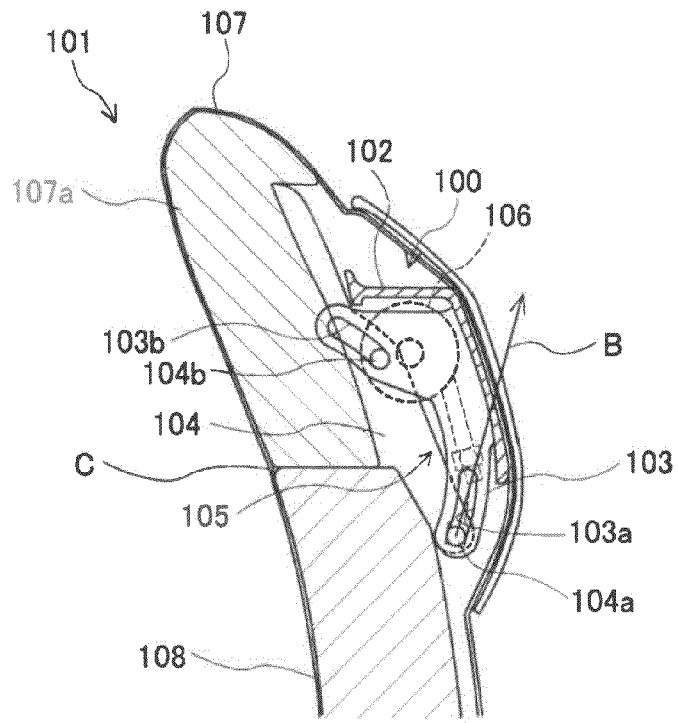
FIG. 11 is a section view of a side support portion in which a known side support apparatus is accommodated.
Figure 12:
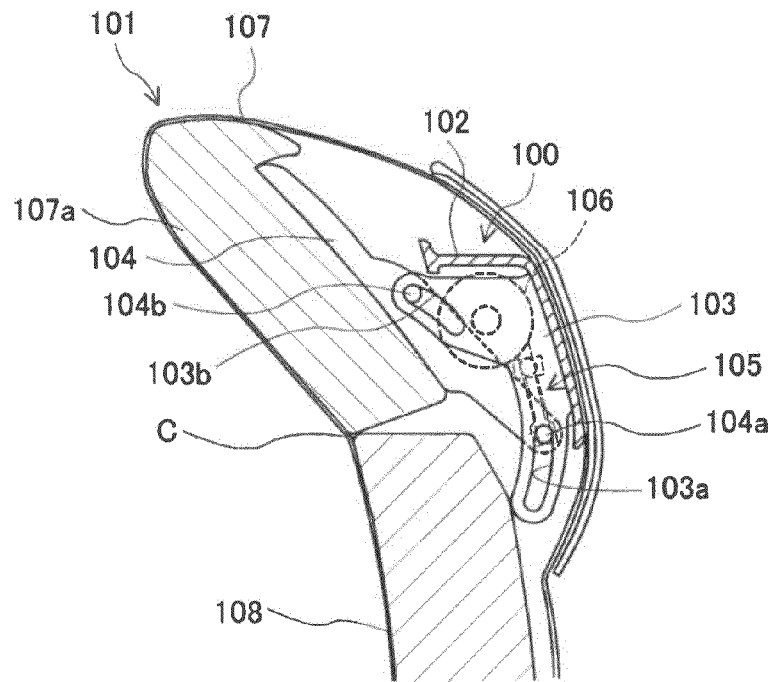
FIG. 12 is a section view illustrating the known side support apparatus shown in FIG. 11 is in a support position.
Figure 13:
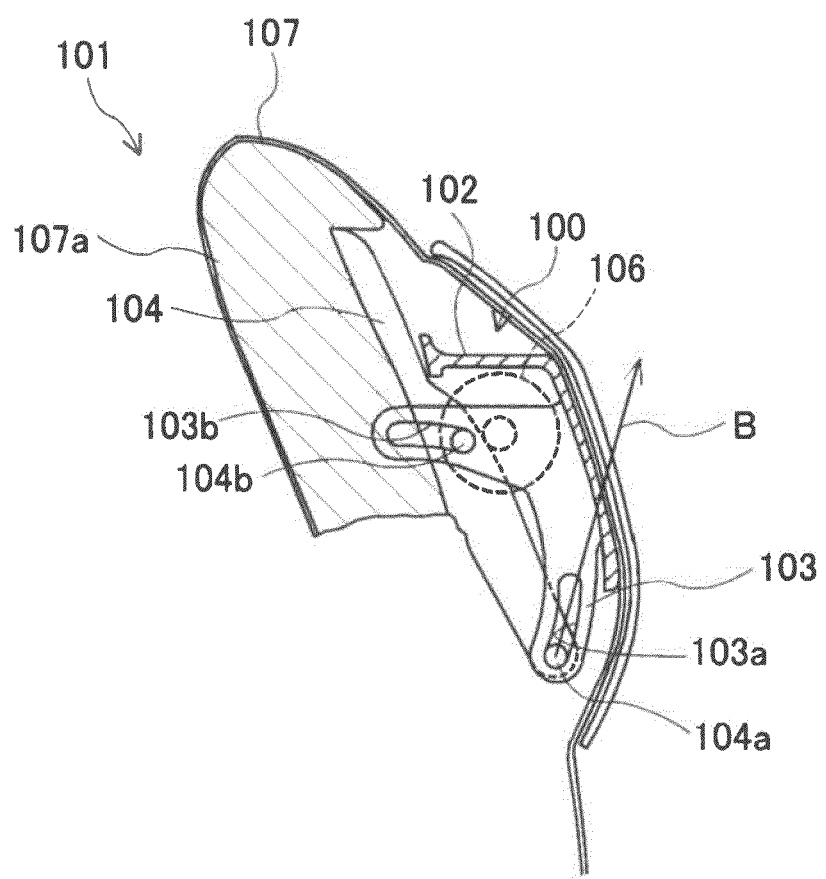
FIG. 13 is a section view illustrating a state where a position of one of engaging holes of the known side support apparatus is changed.

A screw member 62 formed into a long shape is provided inside the shaft portion 601 of the helical gear 60 so as to move in the vertical direction. An internal thread 604 formed in an inner periphery of the shaft portion 601 engages with an external thread 621 formed on an outer periphery of the screw member 62, As shown in FIG. 10, the internal thread 604 of the shaft portion 601 and the external thread 621 of the screw member 62 include trapezoidal screw threads, that is, a trapezoidal screw mechanism. Consequently, a reverse efficiency of the helical gear 60 and the screw member 62 is set to be approximately zero, and thus a transmission of a motion between the helical gear 60 and the screw member 62 is irreversible.

The housing cover 55 includes a screw member moving-hole 551 that is positioned above the screw member 62. The screw member moving-hole 551 is provided for allowing the screw member 62 to vertically move. The screw member moving-hole 551 is formed to allow an upper end portion of the screw member 62 to move in the screw member moving-hole 55 when the screw member 62 axially moves upward. Plural notches 552 are formed on an inner periphery of the screw member moving-hole 551 so as to be equally spaced in a circumferential direction of the moving-hole 55. A detent member 63 is fixedly provided at the upper end portion of the screw member 62 so as to move together with the screw member 62. As shown in FIG. 7, plural projections 631 are formed on an outer periphery of the detent member 63 so as to be engageable with the notches 552 of the screw member moving-hole 551, An engagement of the notches 552 of the screw member moving-hole 551 and the projections 631 of the detent member 63 prevents the screw member 62 from rotating relative to the housing cover 55. A cushion member 64 made of a synthetic rubber is placed on an upper end portion of the shaft portion 601 of the helical gear 60. The cushion member 64 reduces an impact transmitted from the detent member 63 to the shaft portion 601 when the screw member 62 reaches the lower most position.

A cable bracket 65 receives therein the screw member 62 and is fixed to a lower end portion of the screw member 62 by means of an attachment nut 66 tightened from below. The cable bracket 65 includes a fixing face 651 from which the screw member 62 is inserted, and a pair of bent sections 652, 652 formed to extend downward from the fixing face 651. Each of the pair of bent sections 652, 652 is provided with a cable connecting hole 653. The second end portion of the inner cable 471 of the paddle mechanism 4R is connected to one of the cable connecting holes 653, 653, and the second end portion of the inner cable 471 of the paddle mechanism 4L is connected to the other one of the cable connecting holes 653, 653.

As shown in FIG. 8, the side support apparatus 3 of this disclosure is structured so that a direction of a rotation axis of the electric motor 51 and a direction in which the second end portion of the inner cable 471 is pulled by the cable actuator 5 both coincide with the vertical direction of the seatback 12. More details of a structure of the cable actuator 5 than disclosed in this disclosure are disclosed in JP2009-226982A.

Next, an operation of the cable actuator 5 will be described. When the paddle mechanisms 4R and 4L are in the open positions where the upper body of the occupant is not restricted by the paddle mechanisms 4R or 4L, and when electricity is supplied to the electric motor 51 to rotate the electric motor 51, the pinion gear 57 is driven to rotate via the motor cable 512. When the pinion gear 57 is rotated, the helical gear 60 is rotated at the reduced speed because the helical gear 60 is prevented from moving in the vertical direction, that is, the helical gear 60 is unmovable in the axial direction thereof.

As the helical gear 60 is rotated, the screw member 62 moves axially upward inside the screw member moving-hole 551 because the screw member 62 is restricted from rotating by means of the engagement of the external thread 621 of the screw member 62 with the internal thread 604 of the shaft portion 601, that is, the screw member 62 is unrotatable. Here, the screw member 62 is always pulled downward by the tensile force of the inner cable 471. When the helical gear 60 is rotated, the screw member 62 moves upward against the tensile force, that is, the urging force working downwardly from the inner cable 471. Due to a reaction force of the urging force, therefore, the helical gear 60 is rotated in a state where the bottom face thereof is always in contact with the bush 61.

As the screw member 62 moves upward, the second end portion of the inner cable 471 of the right paddle mechanism 4R and the second end portion of the inner cable 471 of the left paddle mechanism 4R are pulled accordingly. As the inner cables 471, 471 are pulled, the paddle mechanisms 4R and 4L are actuated and then move to the support positions where the upper body of the occupant is pushed. In order to return the paddle body 41 to the support position, the electric motor 51 is rotated in the reverse direction to the above-described direction, and thus the second end portion of the inner cable 471 is pulled back.

According to the first embodiment, the pulley 45 is pushed in the extending direction (the lengthwise direction) of the first guide hole 264a by the tensile force that is generated at the inner cable 471 by pulling the second end portion of the inner cable 471. Via the pulley 45, the paddle body 41 is moved toward the support position. Accordingly, a direction in which the paddle 41 is pushed may be changed relative to the direction in which the inner cable 471 is pulled. As a result, the paddle body 41 may be pushed corresponding to the extending direction of the first guide hole 264a.

Consequently, the paddle body 41 is moved without need for a large force, which reduces sizes of the paddle mechanisms 4R and 4L. In addition, the inner cable 471 is pulled for operation, which improves a bearing force of the inner cable 471. In addition, even when a reaction force generated by the occupant seated on the seat 1 is applied to the paddle body 41, a load caused by the reaction force is received by the inner cable 471, and by the guide holes 264a, 264b, and thus a bearing force of the paddle mechanisms 4R and 4L against the reaction force generated by the occupant is increased without increasing the sizes thereof.

The primary pin 43, which is inserted into the moving member 46 and rotatably supports the pulley 45, is inserted into the first guide holes 264a, 264a, and the secondary pin 44, which is inserted into the moving member 46, is inserted into the second guide holes 264b, 264b. This structure makes it easy to mount the paddle 41, the moving member 46 and the pulley 45 on the left mount bracket 261, in a movable manner.

The primary pin 43 that supports the pulley 45 in the rotatable manner is inserted into and engages with the first guide hole 264a, and thus the primary pin 43 serves as a supporting element relative to the pulley 45 and as an engaging element relative to the first guide hole 264a. This makes it convenient to manufacture the paddle mechanisms 4R and 4L by reducing the number of parts related to the paddle mechanisms 4R and 4L. In addition, a rotation axis of the pulley 45 is positioned at the first guide hole 264a, and thus the paddle body 41 is easily moved by the urging force transmitted from the inner cable 471 to the pulley 45, which reduces the urging force necessary for moving the paddle body 41.

The first end portion of the outer cable 471 covering the inner cable 471, that is, the end portion of the outer cable 471 closer to paddle body 41, is integrally attached to the moving member 46. Consequently, the first end portion of the outer cable 472 always moves in response to a movement of the moving member 46 and protects the inner cable 471. In addition, when the reaction force generated by the occupant seated on the seat 1 is applied to the paddle body 41 and thus the moving member 46 is returned, the outer cable 472 is returned together with the inner cable 471. Consequently, no relative movement between the inner cable 471 and the outer cable 472 occurs, and thus no friction is caused between the inner cable 471 and the outer cable 472.

The primary pin 43 is disengaged from the engagement grooves 413, 413 of the paddle body 41 when the paddle body 41 pivots about the secondary pin 44. Consequently, when an air bag that is disposed, for example, behind the paddle body 41, is inflated, an engagement between the paddle body 41 and the primary pin 43 is released so as not to prevent the air bag from inflating.

The electric motor 51 drives to move the screw member 62 in the axial direction via the pinion gear 57 and the helical gear 60, thereby pulling the inner cable 471. Accordingly, the direction in which the inner cable 471 is pulled by the cable actuator 5 coincides with the direction of the rotation axis of the electric motor 51. Consequently, the electric motor 51 and the paddle mechanisms 4R and 4L are positioned in the seatback 12 so that the direction of the rotation axis of the electric motor 51 and the direction in which the second end portion of the inner cable 471 is pulled correspond to the vertical direction. This makes it easy to dispose the side support apparatus 3 in the seatback 12 without causing an interference with other parts, including but not limited to a lumbar support or a seat pad that is provided in a center portion of the seatback 12. In addition, a routing of the operation cable 47 becomes easy.

The cable actuator 5 includes the pinion gear 57 and the helical gear 60, and thus a size of the pinion gear 57 in a radial direction thereof is reduced, which reduces a distance between a center of the pinion gear 57 and a center of the helical gear 60. Consequently, a high reduction ratio and a high transmission efficiency of power' are maintained and, at the same time, a size of the actuator 5 is reduced, and thus the side support apparatus 3 is disposed in the seatback 12 even more easily.

The helical gear 60 and the screw member 62 are engaged with each other by means of an engagement of the trapezoidal screw threads, which allows the motion to be easily transmitted from the helical gear 60 to the screw member 52 in an irreversible manner. Accordingly, the cable actuator 5 is not rotated in the reverse direction when the reaction force generated by the occupant seated on the seat 1 is applied to the paddle body 41 and thus a load is transmitted from the screw member 62 to the helical gear 60. Consequently, the paddle body 41 supports the occupant seated on the seat 1 reliably.

The inner cable 471 of the right paddle mechanism 4R and the inner cable 471 of the left paddle mechanism 4R are both connected to a single screw member, that is, the screw member 62. And thus a single cable actuator, that is, the cable actuator 5, operates the paddle mechanisms 4R and 4L. This reduces the number of the parts, thereby allowing the side support apparatus 3 to be manufactured at a low cost and in a small size. In addition, the paddle mechanisms 4R and 4L are operated by the single cable actuator 5, and thus the paddle mechanisms 4R and 4L may be synchronously operated. As a result, the side support apparatus 3 gives no sense of uncomfortable to the occupant seated on the seat 1.

Next, other embodiments of this disclosure will be explained. This disclosure is not limited to the above-described embodiment but may be varied or extended as will be described hereunder. The guide portion for restricting the movement of the moving member 46 may be a groove portion provided at the left mount bracket 26L or may be a projection or the like formed so as to surround a vicinity of a trajectory path of the moving member 46, instead of the through hole.

The side support apparatus 3 of this disclosure may be structured so that the moving member 46 engages directly with guide holes 264a, 264b without using the primary pin 43 or secondary pin 44. Alternatively, the pulley 45 may be supported directly by the moving member 46 without using the primary pin 43. Alternatively, the rotation axis of the pulley 45 may be positioned at any other area than the guide holes 264a, 264b as long as the moving member 46 moves smoothly without being obstructed when the inner cable 471 is pulled.

The cable actuator 5 may be attached to the right side frame 21R or to other portion of the seatback frame 2. In addition, two of the cable actuators 5, 5 may be provided so as to actuate the paddle mechanisms 4R and 4L individually. This disclosure is applicable not only to a driver's seat or to a front passenger's seat but also to a middle seat or a rear seat of a vehicle.

Here, related to the description "the tensile force pushes the pulley 45 in the extending direction (the lengthwise direction) of the first guide hole 264a, that is, in the direction in which the first guide hole 264a extends", "the direction in which the pulley 5 is pushed" does not have to be exactly the same as the extending direction (the lengthwise direction) of the first guide portion 264a. Cases where the direction in which the pulley 5 is pushed is slightly different from the extending direction of the first guide portion 264a are also included in the above-mentioned description if the effects of the embodiments of this disclosure, which will be stated below, are obtained.

Due to the above described structure, the pulley 45 is pushed in the extending direction (the lengthwise direction) of the first guide hole 264a by the tensile force that is generated at the inner cable 471 by pulling the second end portion of the inner cable 471. And thus, the paddle body 41, together with the pulley 45, is movable toward the support position relative to the left mount bracket 26L. Accordingly, the direction in which the paddle 41 is pushed may be changed relative to the direction in which the inner cable 471 is pulled. As a result, the paddle body 41 may be pushed corresponding to the extending direction of the first guide hole 264a.

Consequently, the paddle body 41 is moved without need for a large force, which reduces sizes of the paddle mechanisms 4R and 4L. In addition, the inner cable 471 is pulled for operation, which improves the bearing force of the inner cable 471. In addition, even when the reaction force generated by the occupant seated on the seat 1 is applied to the paddle body 41, the load caused by the reaction force is received by the inner cable 471, and by the guide holes 264a, 264b, and thus the bearing force of the paddle mechanisms 4R and 4L against the reaction force generated by the occupant is increased without increasing the sizes thereof.

According to the embodiments, the first guide hole 264a and the second guide hole 264b are through holes having long-hole shapes and formed on the left mount bracket 26L. The paddle body 41, the primary pin 43, the secondary pin 44, the pulley 45 and the moving member 46 (collectively serving as the support structure) include the primary pin 43 inserted into the first guide hole 264a to be movable in the lengthwise direction of the first guide hole 264a, the secondary pin 44 inserted into the second guide hole 264b to be movable in the lengthwise direction of the second guide portion 264b, and the moving member 46 into which the primary pin 43 and the secondary pin 44 are inserted. The pulley 45 is attached to the moving member 46 to be rotatable about the axis of the primary pin 43, The primary pin 43, which is inserted into the moving member 46 and rotatably supports the pulley 45, is inserted into the first guide holes 264a, 264a, and the secondary pin 44, which is inserted into the moving member 46, is inserted into the second guide holes 264b, 264b. This structure makes it easy to mount the paddle 41, the moving member 46 and the pulley 45 on the left mount bracket 26L in the movable manner.

The primary pin 43 that supports the pulley 45 in the rotatable manner is inserted into and engages with the first guide hole 264a, and thus the primary pin 43 serves as the supporting element relative to the pulley 45 and as the engaging element relative to the first guide hole 264a. This makes it convenient to manufacture the paddle mechanisms 4R and 4L by reducing the number of parts related to the paddle mechanisms 4R and 4L. In addition, the rotation axis of the pulley 45 is positioned at the first guide hole 264a, and thus the paddle body 41 is easily moved by the urging force transmitted from the inner cable 471 to the pulley 45, which reduces the urging force necessary for moving the paddle body 41.

According to the embodiments, the operation mechanism 4R, 4L of the side support apparatus 3 further includes the outer cable 472 which covers the inner cable 471 so as to be slidably movable and which includes the first end portion being positioned closer to the paddle body 41, the primary pin 43, the secondary pin 44, the pulley 45 and the moving member 46, and the second end portion being positioned closer to the second end portion of the inner cable 471, The first end portion of the outer cable 472 is integrally attached to the paddle body 41, the primary pin 43, the secondary pin 44, the pulley 45 and the moving member 46 and the second end portion of the outer cable 472 is fixedly attached to the attachment bracket 56.

The first end portion of the outer cable 471 covering the inner cable 471, that is, the end portion of the outer cable 471 closer to paddle body 41, is integrally attached to the moving member 46. Consequently, the first end portion of the outer cable 472 always moves in response to the movement of the moving member 46 and protects the inner cable 471. In addition, when the reaction force generated by the occupant seated on the seat 1 is applied to the paddle body 41 and thus the moving member 46 is returned, the outer cable 472 is returned together with the inner cable 471. Consequently, no relative movement between the inner cable 471 and the outer cable 472 occurs, and thus no friction is caused between the inner cable 471 and the outer cable 472.

According to the embodiments, the moving member 46 includes the moving member 46 to which the pulley 45 is attached and the paddle body 41 structured to be movable together with the moving member 46 for supporting the sides of the body of the seat occupant. The paddle body 41 includes the engagement groove 413 engaging with and disengaging from the primary pin 43, and is supported by the secondary pin 44 to be pivotable about the secondary pin 44. The paddle body 41 is integrally movable with the moving member 46 when the primary pin 43 engages with the engagement groove 413. The primary pin 43 disengages from the engagement groove 413 when the paddle body 41 pivots about the axis of the secondary pin 44 relative to the supporting member (46).

The primary pin 43 is disengaged from the engagement grooves 413, 413 of the paddle body 41 when the paddle body 41 pivots about the secondary pin 44. Consequently, when the air bag that is disposed, for example, behind the paddle body 41, is inflated, the engagement between the paddle body 41 and the primary pin 43 is released so as not to prevent the air bag from inflating.

According to the embodiments, the electric motor 51 drives to move the screw member 62 in the axial direction via the pinion gear 57 and the helical gear 60, thereby pulling the inner cable 471. Accordingly, the direction in which the inner cable 471 is pulled by the cable actuator 5 coincides with the direction of the rotation axis of the electric motor 51. Consequently, the electric motor 51 and the paddle mechanisms 4R and 4L are positioned in the seatback 12 so that the direction of the rotation axis of the electric motor 51 and the direction in which the second end portion of the inner cable 471 is pulled correspond to the vertical direction. This makes it easy to dispose the side support apparatus 3 in the seatback 12 without causing the interference with other parts, In addition, the routing of the operation cable 47 becomes easy.

The cable actuator 5 includes the pinion gear 57 and the helical gear 60, and thus the size of the pinion gear 57 in the radial direction thereof is reduced, which reduces the distance between the center of the pinion gear 57 and the center of the helical gear 60. Consequently, the high reduction ratio and the high transmission efficiency of power are maintained and, at the same time, the size of the actuator 5 is reduced, and thus the side support apparatus 3 is disposed in the seatback 12 even more easily.

According to the embodiments, the helical gear 60 and the screw member 62 engage with each other by the trapezoidal screw mechanism.

The helical gear 60 and the screw member 62 are engaged with each other by means of the engagement of the trapezoidal screw threads, which allows the motion to be easily transmitted from the helical gear 60 to the screw member 52 in the irreversible manner. Accordingly, the cable actuator 5 is not rotated in the reverse direction when the reaction force generated by the occupant seated on the seat 1 is applied to the paddle body 41 and thus the load is transmitted from the screw member 62 to the helical gear 60. Consequently, the paddle body 41 supports the occupant seated on the seat 1 reliably.

According to the embodiments, the operation mechanism 4R, 4L of the side support apparatus 3 is accommodated in each of the right side support portion 121R and the left side support portion 121L, the cable actuator 5 refers to one cable actuator 5, and the screw member 62 refers to one screw member 62. The inner cable 471 of the right side support portion 121R and the inner cable 471 of the left side support portion 121L are connected to the screw member 62.

The inner cable 471 of the right paddle mechanism 4R and the inner cable 471 of the left paddle mechanism 4R are both connected to the single screw member, that is, the screw member 62. And thus the single cable actuator, that is, the cable actuator 5, operates the paddle mechanisms 4R and 4L. This reduces the number of the parts, thereby allowing the side support apparatus 3 to be manufactured at the low cost and in the small size. In addition, the paddle mechanisms 4R and 4L are operated by the single cable actuator 5, and thus the paddle mechanisms 4R and 4L may be synchronously operated. As a result, the side support apparatus 3 gives no sense of uncomfortable to the occupant seated on the seat 1.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An operation mechanism of a side support apparatus adapted to be accommodated in each of a right side support portion and a left side support portion both provided at a seatback, and being movable between a support position at which sides of a body of a seat occupant is supported and an open position at which the sides of the body of the seat occupant is unsupported, the operation mechanism of the side support apparatus comprising:

a support structure including a pulley which is rotatable and being movable between the open position and the support position;

a first fixing portion adapted to be fixedly provided at a seatback member, and including a first guide portion and a second guide portion, the first guide portion being provided at the first fixing portion in an extending manner to restrict a direction of a movement of the support structure and the second guide portion being provided at the first fixing portion in an extending manner in a direction that crosses with an extending direction of the first guide portion and restricting the direction of the movement of the support structure cooperatively with the first guide portion; and a drive cable, the drive cable being fixedly attached to the first fixing portion at a first end portion of the drive cable, the drive cable being engaged with an outer periphery of the pulley at an intermediate between the first end portion and a second end portion of the drive cable, wherein the pulley is pushed by a tensile force generated at the drive cable by pulling the drive cable at the second end portion so that the pulley is movable in the extending direction of the first guide portion and that the support structure is movable relative to the first fixing portion in a direction toward the support position.

2. The operation mechanism of the side support apparatus according to claim 1, wherein the first guide portion and the second guide portion are through holes having long-hole shapes and formed on the first fixing portion, the support structure includes a first pin member inserted into the first guide portion to be movable in a lengthwise direction of the first guide portion, a second pin member being inserted into the second guide portion to be movable in a lengthwise direction of the second guide portion, and a moving body into which the first pin member and the second pin member are inserted, and the pulley is attached to the moving body to be rotatable about an axis of the first pin member.

3. The operation mechanism of the side support apparatus according to claims 1, further comprising an outer cable which covers the drive cable so as to be slidably movable, and includes a first end portion being positioned closer to the support structure and a second end portion being positioned closer to the second end portion of the drive cable, the first end portion of the outer cable being integrally attached to the support structure and the second end portion of the outer cable being fixedly attached to a second fixing portion.

4. The operation mechanism of the side support apparatus according to claim 3, wherein
the moving body includes a supporting body to which the pulley is attached and a support body structured to be movable together with the supporting body for supporting the sides of the body of the seat occupant,
the support body includes a notch engaging with and disengaging from the first pin member and is supported by the secondary pin member to be pivotable about the secondary pin member,
the support body is integrally movable with the supporting body when the primary pin member engages with the notch, and
the primary pin member disengages from the notch when the support body pivots about an axis of the secondary pin member relative to the supporting body.

5. The operation mechanism of the side support apparatus according to claim 2, further comprising an outer cable which covers the drive cable so as to be slidably movable, and includes a first end portion being positioned closer to the support structure and a second end portion being positioned closer to the second end portion of the drive cable, the first end portion of the outer cable being integrally attached to the support structure and the second end portion of the outer cable being fixedly attached to a second fixing portion.

6. The operation mechanism of the side support apparatus according to claim 5, wherein
the moving body includes a supporting body to which the pulley is attached and a support body structured to be movable together with the supporting body for supporting the sides of the body of the seat occupant,
the support body includes a notch engaging with and disengaging from the first pin member and is supported by the secondary pin member to be pivotable about the secondary pin member,
the support body is integrally movable with the supporting body when the primary pin member engages with the notch, and
the primary pin member disengages from the notch when the support body pivots about an axis of the secondary pin member relative to the supporting body.

7. The operation mechanism of the side support apparatus according to claim 2, wherein
the moving body includes a supporting body to which the pulley is attached and a support body structured to be movable together with the supporting body for supporting the sides of the body of the seat occupant,
the support body includes a notch engaging with and disengaging from the first pin member and is supported by the secondary pin member to be pivotable about the secondary pin member,
the support body is integrally movable with the supporting body when the primary pin member engages with the notch, and
the primary pin member disengages from the notch when the support body pivots about an axis of the secondary pin member relative to the supporting body.

8. A side support apparatus adapted to be mounted on a vehicular seat, comprising:
an operation mechanism of a side support apparatus adapted to be accommodated in each of a right side support portion and a left side support portion both provided at a seatback, and being movable between a support position at which sides of a body of a seat occupant is supported and an open position at which the sides of the body of the seat occupant is unsupported, the operation mechanism of the side support apparatus including a support structure including a pulley which is rotatable and being movable between the open position and the support position, a first fixing portion adapted to be fixedly provided at a seatback member, and including a first guide portion and a second guide portion, the first guide portion being provided at the first fixing portion in an extending manner to restrict a direction of a movement of the support structure and the second guide portion being provided at the first fixing portion in an extending manner in a direction that crosses with an extending direction of the first guide portion and restricting the direction of the movement of the support structure cooperatively with the first guide portion, and a drive cable, the drive cable being fixedly attached to the first fixing portion at a first end portion of the drive cable, the drive cable being engaged with an outer periphery of the pulley at an intermediate between the first end portion and a second end portion of the drive cable, wherein
the pulley is pushed by a tensile force generated at the drive cable by pulling the drive cable at the second end portion so that the pulley is movable in the extending direction of the first guide portion and that the support structure is movable relative to the first fixing portion in a direction toward the support position; and
a cable drive device including an electric motor which rotates for pulling the drive cable at the second end portion thereof when electricity is supplied, a pinion gear connected to an output shaft of the electric motor, a helical gear engaging with the pinion gear and being unmovable in a direction of a rotation axis thereof, and a screw member being movable in a direction of a rotation axis thereof and unrotatable, an outer periphery of the screw member engaging with an inner periphery of the helical gear, an end portion of the screw member being connected to the drive cable, wherein
the screw member is moved in the direction of the rotation axis thereof via the pinion gear and the helical gear by means of driving the electric motor to rotate so that the drive cable is pulled.

9. The side support apparatus adapted to be mounted on the vehicular seat according to claim 8, wherein
the first guide portion and the second guide portion are through holes having long-hole shapes and formed on the first fixing portion,
the support structure includes a first pin member inserted into the first guide portion to be movable in a lengthwise direction of the first guide portion, a second pin member being inserted into the second guide portion to be movable in a lengthwise direction of the second guide portion, and a moving body into which the first pin member and the second pin member are inserted, and
the pulley is attached to the moving body to be rotatable about an axis of the first pin member.

10. The side support apparatus adapted to be mounted on the vehicular seat according to claim 9, wherein the helical gear and the screw member engage with each other by a trapezoidal screw mechanism.

11. The side support apparatus adapted to be mounted on the vehicular seat according to claim 8, further comprising an outer cable which covers the drive cable so as to be slidably movable, and includes a first end portion being positioned closer to the support structure and a second end portion being positioned closer to the second end portion of the drive cable, the first end portion of the outer cable being integrally attached to the support structure and the second end portion of the outer cable being fixedly attached to a second fixing portion.

12. The side support apparatus adapted to be mounted on the vehicular seat according to claim 11, wherein the helical gear and the screw member engage with each other by a trapezoidal screw mechanism.

13. The side support apparatus adapted to be mounted on the vehicular seat according to claim 8, wherein
the moving body includes a supporting body to which the pulley is attached and a support body structured to be movable together with the supporting body for supporting the sides of the body of the seat occupant,
the support body includes a notch engaging with and disengaging from the first pin member and is supported by the secondary pin member to be pivotable about the secondary pin member,
the support body is integrally movable with the supporting body when the primary pin member engages with the notch, and
the primary pin member disengages from the notch when the support body pivots about an axis of the secondary pin member relative to the supporting body.

14. The side support apparatus adapted to be mounted on the vehicular seat according to claim 13, wherein the helical gear and the screw member engage with each other by a trapezoidal screw mechanism.

15. The side support apparatus adapted to be mounted on the vehicular seat according to claim 8, wherein the helical gear and the screw member engage with each other by a trapezoidal screw mechanism.

16. The side support apparatus adapted to be mounted on the vehicular seat according to claim 15, wherein
the operation mechanism of the side support apparatus is accommodated in each of the right side support portion and the left side support portion, the cable drive unit refers to one cable drive unit, the screw member refers to one screw member, and the drive cable of the right side support portion and the drive cable of the left side support portion are connected to the screw member.

17. The side support apparatus adapted to be mounted on the vehicular seat according to claim 8, wherein
the operation mechanism of the side support apparatus is accommodated in each of the right side support portion and the left side support portion, the cable drive unit refers to one cable drive unit, the screw member refers to one screw member, and the drive cable of the right side support portion and the drive cable of the left side support portion are connected to the screw member.

* * * * *